United States Patent [19]

Okel

[11] Patent Number: 5,194,279
[45] Date of Patent: Mar. 16, 1993

[54] GLUCOAMYLASE REMOVAL USING NITROGEN-FUNCTIONALIZED AMORPHOUS PRECIPITATED SILICA

[75] Inventor: Timothy A. Okel, Trafford, Pa.

[73] Assignee: PPG Industries, Inc., Pittsburgh, Pa.

[21] Appl. No.: 718,499

[22] Filed: Jun. 20, 1991

[51] Int. Cl.$^5$ ............................ A23L 2/00; C12H 1/02
[52] U.S. Cl. .................................... 426/330; 426/3304; 426/423; 426/590; 426/592; 210/606; 210/607
[58] Field of Search ................... 426/330.4, 423, 592, 426/330, 590; 210/606, 607

[56] References Cited

U.S. PATENT DOCUMENTS

| | | | |
|---|---|---|---|
| 3,796,634 | 3/1974 | Haynes et al. | 195/63 |
| 3,821,133 | 6/1974 | Doran, Jr. et al. | 260/3 |
| 3,859,169 | 1/1975 | O'Driscoll et al. | 195/63 |
| 3,884,285 | 5/1975 | Russell et al. | 152/330 R |
| 3,953,223 | 4/1976 | Doran et al. | 106/308 |
| 3,994,742 | 11/1976 | Russell et al. | 106/288 |
| 4,034,139 | 7/1977 | Mazargull et al. | 428/405 |
| 4,102,746 | 7/1978 | Goldberg | 195/63 |
| 4,119,494 | 10/1978 | Durand et al. | 195/68 |
| 4,132,596 | 1/1979 | Mieller et al. | 195/63 |
| 4,169,014 | 9/1979 | Goldberg | 435/182 |
| 4,268,419 | 5/1981 | Rohrbach | 252/430 |
| 4,430,348 | 2/1984 | Duncombe et al. | 426/13 |
| 4,525,456 | 6/1985 | Rohrbach | 435/176 |

FOREIGN PATENT DOCUMENTS

| | | | |
|---|---|---|---|
| 1203187 | 4/1986 | Canada | 195/35.4 |
| 0239079 | 3/1986 | European Pat. Off. | |

OTHER PUBLICATIONS

Hostetler et al., *Diffusion Into and Adsorption of Polyethylenimine on Porous Silica Gel*, Journal of Polymer Science, Polymer Chemistry Edition vol. 12, 29–43 (1974).

Wasserman et al., *Immobilization of glucoamylase from Aspergillus Niger on poly(ethylenimine)-coated non-porous glass beads*, Enzyme Microb. Technol. vol. 4, 107–109 (1982).

*Immobilized Enzymes, Preparation and Engineering, Recent Advances*, Chemical Technology Review No. 133. vii–xii, 31–33, 129–131, 136–138.

Rounds et al, *Factors Contributing to Intrinsic Loading Capacity in Silica-Based Packing Materials for Preparative Anion-Exchange Protein Chromatography*, Journal of Chromatograph, 362 1986) 187–196.

Lindquist et al, *The Role of Polyelectrolyte Charge Density and Molecular Weight on the Adsorption and Flocculation of Colloidal Silica with Polyethylenimine*, Journal of Colloid and Interface Science, vol. 55, No. 1, Apr. 1976, 45–59.

*Introduction*, Dow Chemical Company, Date Unknown, pp. 1–33.

M. Jach et al, *Adsorption of Glucoamylase on DEAE-Cellulose*, Starch Starke, 35 (1983) Nr. 12 S. 427–430.

S. F. D'Souza et al, *Immobilization of Yeast Cells by Adhesion to Glass Surface Using Polyetheleneimine*, Biotechnology Letters, vol. 8, No. 9, pp. 643–648 (1986).

N. Kitagawa, *The Use of Polyethyleneimine Ligands in a Liquid Chromatographic Stationary Phase for Biomolecular Separations*, Magazine of Liquid and Gas Chromatography, vol. 6, No. 3, Mar. 1988.

"Flow Conditioning in Powdered and Granular Food Products", Permissible Applications, PPG Industries, Inc.

*Primary Examiner*—Carolyn Paden
*Attorney, Agent, or Firm*—George D. Morris

[57] ABSTRACT

An aqueous medium in which glucoamylase is dissolved, is contacted with nitrogen-functionalized amorphous precipitated silica having a pore diameter at the maximum of the volume pore size distribution function of from about 7 to about 100 nanometers, whereby at least a portion of the glucoamylase is adsorbed by the nitrogen-functionalized amorphous precipitated silica. The process is particularly suitable for removing glucoamylase from draught beer.

26 Claims, No Drawings

GLUCOAMYLASE REMOVAL USING NITROGEN-FUNCTIONALIZED AMORPHOUS PRECIPITATED SILICA

BACKGROUND OF THE INVENTION

The present invention provides a process for removing glucoamylase from beer. The term "beer" as used in the present specification and claims is a brewed fermentation product produced from malted cereal grains (usually the chief cereal grain is barley) and hops as the main starting materials and includes many types of brewed beverages. Such beverages include, but are not limited to, lager, pilsner, Dortmund and Munich beers, as well as top fermented beverages such as ale, porter, and stout.

Although the details may vary somewhat from brewery to brewery, a generally representative procedure for making beer is as follows: (1) Ground malt (grist) is placed in a mash tun for saccharification together with water, and while the temperature is gradually raised from about 45°-55° C. to about 75°-80° C. over a period of from about 2 to about 3 hours, starch in the malt is decomposed into sugars such as maltose, dextrin, and the like; (2) The resulting mash after saccharification is filtered to obtain a clear malt liquor (wort); (3) Hops are added to the filtered malt liquor and boiled for about an hour or two; (4) The hot wort is transferred to a precipitation tank and, after removing hot coagulates, cooled to 5°-10° C.; (5) Yeast is added to the cooled wort, and oxygen is supplied to promote the growth of the yeast; (6) Fermentation is effected at temperatures of about 10° C. for about a week (primary fermentation); (7) Secondary fermentation and aging of the resulting beer are effected in a storage tank at low temperatures of about 0° C. for one to two months; (8) The beer is then filtered and packed into containers (usually bottles, cans, or barrels).

A typical lager sweet wort comprises a complex mixture of starch derived carbohydrates, which are classified as fermentable or nonfermentable according to whether they can be converted into ethanol by brewer's yeast. The fermentable carbohydrates are formed by hydrolysis of grain starches by two enzymes, $\alpha$- and $\beta$-amylase, derived from malted barley. In most American lagers malted barley also serves as the predominant starch source while a smaller proportion is derived from nondiastatic adjunct grains. In the United States, corn and #4 brewer's rice are the predominant adjuncts.

All grain starches are glucose homopolymers in which the glucose residues are linked by either $\alpha$-1,4 or $\alpha$-1,6 bonds. During the mashing cycle the starches are first solubilized and then a portion of the solubilized large starch molecules are predominantly hydrolyzed to three low molecular weight sugars which brewer's yeast can ferment to ethyl alcohol. The major fermentable sugars are glucose, maltose, and maltotriose while traces of sucrose and fructose are also present. The nonfermentable or limit dextrin fraction consists of all sugars of a higher degree of polymerization (DP) than maltotriose. The bulk of the limit dextrin fraction is composed of polysaccharides which are greater than 10,000 molecular weight.

As indicated above, the hydrolysis of the grain starches is catalyzed by two amylases endogenous to malted barley. One, $\alpha$-amylase, is an endoamylase which randomly cleaves $\alpha$-1,4 bonds in the interior of the raw, largely insoluble starch molecules, fragmenting them into large but soluble polysaccharides termed dextrins. The second, $\beta$-amylase, is an exoamylase which sequentially cleaves $\alpha$-1,4 bonds from the nonreducing end of these dextrins producing the three fermentable sugars described above. Both enzymes are inactive towards the $\alpha$-1,6 linkages (branch points) of the starches (i.e., they are unsuitable to debranch the starch molecule) and this results in the formation of the limit dextrins described above.

After completing the mash cycle, the spent grains are removed by passing the mash through a lauter tun to obtain the clarified lager sweet wort. The wort is then transferred to a brew kettle and boiled vigorously for about 1 to 2 hours to inactivate the malt enzymes. It is then cooled, pitched with yeast, and fermented at temperatures ranging from about 8° C. to about 16° C. to convert the three sugars described above to ethanol. The composition of the wort can vary depending on the starting materials, mash cycle, and other variables. The carbohydrate composition of a typical wort comprises from about 65 to about 80 percent fermentable sugars, and from about 20 to about 35 percent limit dextrins. During fermentation much of the fermentable fraction is converted to ethanol. The final ethanol concentration at the end of fermentation ordinarily ranges from about 3 to about 6 percent w/w. The limit dextrins are not converted during fermentation and form the bulk of the dissolved solids, commonly referred to as real extract, in the final beer.

Reduced calorie beers have recently become popular in the United States and elsewhere. These beers may be formulated by (1) reducing both the alcohol and real extract concentrations in the beer to attain the desired calorie level, or (2) by hydrolyzing the limit dextrins with exogenous enzymes, one component of which is capable of debranching the limit dextrins. The latter method is advantageous since it allows one to attain the desired calorie level with a minimum reduction of the alcohol content of the packaged product. The enzyme most commonly used to hydrolyze the limit dextrins is glucoamylase, also known as amyloglucosidase or exo-1,4,$\alpha$-glucosidase, which is a nonspecific exoamylase derived from a variety of fungal sources (e.g., *Aspergillus niger, Rhizopus delemar*, etc.) Glucoamylase is active versus both $\alpha$-1,4 and $\alpha$-1,6 linkages and therefore is capable of completely hydrolyzing starch to glucose. It attacks the starch molecule from the nonreducing end producing glucose as substantially the sole end product. It is also active versus starch derived oligosaccharides, e.g., maltose, maltotriose, isomaltose, etc. Most commercial glucoamylase is isolated from the mold *Aspergillus niger*. The glucoamylase produced by this organism is extracellular and is a glycoprotein containing approximately 16 percent carbohydrate.

In theory, glucoamylase may be added at any time during the brewing process. In practice however, brewers usually prefer to add glucoamylase during fermentation because the fermentation process itself requires from about 6 to about 15 days, depending on pitching rate, fermentation temperature, etc. The brewhouse operations, in contrast, are of much shorter duration (about 2 to 4 hours per brew) and operate under tight scheduling constraints. Therefore debranching enzymes are usually employed as fermentation adjuncts as disclosed in U.S. Pat. No. 3,379,534, and the limit dextrins are hydrolyzed to fermentable sugars, which the yeast converts to ethanol. These beers ferment to a lower specific gravity due to increased alcohol and decreased real extract than would the same beer without exogenous enzymes. Such beers are referred to as super attenuated beers.

A fermenting beer stream during primary fermentation contains a large concentration of suspended solids which originate from several sources. When the wort is cooled after kettle boil, a heavy precipitate forms which is allowed to settle out in a tank. The precipitate (a mixture of protein, carbohydrate, etc.) is referred to as traub and the settling process is referred to as hot-break. Traub separation is not complete during the hot-break, and its formation continues even during fermentation. Additionally, the wort or beer is pitched with a large (on the order of $1 \times 10^7$ cells per milliliter of wort) concentration of brewer's yeast at the beginning of the fermentation. The yeast typically multiplies to six to nine times its original concentration at high kraeusen and then settles out as the specific gravity decreases toward the end of fermentation.

It is economically necessary for brewers to reclaim most of the expanded yeast crop at the end of fermentation to repitch fresh wort in order to supplement the crop produced by primary propagation. Ordinarily brewers are able to pitch about 3 to 6 fresh fermentations with the yeast reclaimed from one fermenter.

In addition to traub formation and yeast multiplication, there are two other major changes that occur during fermentation: (1) large quantities of carbon dioxide are evolved during active fermentation, and (2) the specific gravity of the beer decreases markedly.

The glucoamylase may be immobilized on a water insoluble solid support and brought into contact with the wort or beer. Several types of immobilized enzyme reactors have been described in the literature. The most prevalent are those in which the enzymes have been immobilized on particulate carriers. These include: (1) batch stir systems in which the immobilized adduct is stirred in the wort or beer and is later recovered by filtration, (2) plug flow reactors, also known as fixed bed reactors, in which the immobilized adduct is packed in a column and the wort or beer is passed through it in a manner similar to a column chromatography operation, (3) fluidized bed reactors, which are similar to plug flow reactors except that the wort or beer is circulated into the bottom of the column at sufficiently greater flow rate to fluidize the bed.

Reactors based on glucoamylase immobilized on particulate carriers are not suitable for processing a beer during primary fermentation for several reasons:

(1). The batch stir system is impractical since it would require that the yeast and the immobilized derivative be separated from each other at the end of fermentation in order to recover and reuse both the enzyme conjugate and the yeast cream. This separation would prove both difficult and costly.

(2). Plug flow reactors do not support flow of wort or beer streams containing large and variable amounts of suspended solids typical of a fermenting lager stream. Such reactors plug rapidly as the solids accumulate at the entrance face of the immobilized glucoamylase bed.

(3). Fluidized beds are impractical since the density of the fermenting beer stream is continuously decreasing during fermentation. Inasmuch as particle fluidization is dependent on the density of the wort or beer, the flow rate would have to be continuously increased throughout fermentation to compensate for the density decrease in order to keep the bed fluidized. In addition, during active fermentation the large quantities of carbon dioxide evolved would disrupt the even flow of liquid and make fluidization more difficult and possibly would channel the bed. Most fluidized bed reactors contain support retainers at both ends in order to prevent flow of the immobilized glucoamylase back into the wort or beer feed tank or into the product receiver. The suspended solid could accumulate at the retainers and block flow. Finally, at the end of fermentation the immobilized glucoamylase would have to be separated from the yeast that would be entrained with the residual beer.

In a effort to overcome the difficulties inherent in particulate systems, other types of reactors have been developed in which the glucoamylase has been immobilized by attachment to monolithic solid supports. The construction, configuration, and arrangement of such monolithic reactors vary from one system to another, but in general the wort or beer is brought into contact with the glucoamylase so immobilized.

One class of monolithic reactor is based on the immobilization of glucoamylase by attachment to various membranes. These membrane reactors suffer from the lack of strength of the membranes employed and the required backing on large amounts of the membrane support materials.

Another class of monolithic reactors is based on the immobilization of glucoamylase by attachment to ceramic monoliths having a lattice of generally parallel channels. The channels have cross-sectional linear dimensions on the order of from about 50 to about 3000 micrometers so that the flow of yeast and other undissolved solids present in the fermenting stream will pass through without being obstructed and so that there is sufficient surface area within a reactor of reasonable size to attach a reasonable amount of glucoamylase. Laboratory-sized reactors of this type function well, but the ceramic supports are very expensive and they are fragile. The capital expenditures for production-sized reactors are believed to be enormous.

By far the simplest manner of using glucoamylase is to dissolve the requisite amount in the wort or beer to be treated. This method has been widely employed for pasteurized beers since the heat of pasteurization destroys the glucoamylase. Glucoamylase has not been used in the production of draught beers because the production of these beers does not employ a pasteurization step; hence there is no heat available to destroy the glucoamylase.

THE INVENTION

A process has now been discovered for removing glucoamylase from aqueous media. The process is of general utility, but it is especially applicable to the production of beer. While beneficial results may be achieved through its use in producing beers of all classes, its use is particularly beneficial in production of draught beer.

Accordingly, in a process for removing glucoamylase from an aqueous medium in which the glucoamylase is dissolved, the invention is the improvement comprising contacting the aqueous medium with nitrogen-functionalized amorphous precipitated silica, wherein the nitrogen-functionalized amorphous precipitated silica is amorphous precipitated silica having associated therewith at least one organic surface modifier having at least one nitrogen-containing group selected from the class consisting of amino, quaternary ammonium, and diazonium, and wherein said nitrogen-functionalized amorphous precipitated silica has a pore diameter at the maximum of the volume pore size distribution function of from about 7 to about 100 nanometers.

The preferred aqueous medium contacted with the nitrogen-functionalized amorphous precipitated silica is beer. The beer may be in any form following fermentation. It is usually process beer, although been diluted to any desired concentration may used. Process beer is beer before dilution, if any, prior to packaging. Various optional additives are sometimes added to the beer at various stages in the beermaking process. When additives are to be added to the beer, contacting the beer with the nitrogen-functionalized amorphous precipitated silica may be accomplished before or after they are added.

The nitrogen-functionalized amorphous precipitated silica is selective in that it efficiently removes glucoamylase but removes very little, if any, of the proteins which provide desirable flavor and very little, if any, of the proteins which provide desirable foaming qualities. Although it is not desired to be bound by any theory, it is believed the selectivity is due in large measure to the relative dimensions of the glucoamylase molecules and the pores of the nitrogen-functionalized amorphous precipitated silica.

Many different amorphous precipitated silicas are known and have been used in a wide variety of applications. Amorphous precipitated silicas are most commonly produced by precipitation from an aqueous solution of sodium silicate using a suitable acid such as sulfuric acid, hydrochloric acid, and/or carbon dioxide. Processes for producing amorphous precipitated silicas are described in detail in U.S. Pat. Nos. 2,657,149; 2,940,830; and 4,681,750, the entire disclosures of which are incorporated herein by reference, including especially the processes for making amorphous precipitated silicas and the properties of the products. These prior amorphous precipitated silicas, however, did not possess the combination of properties and functionality as would render them efficient agents for the removal of glucoamylase from aqueous media.

Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15-29, 172-176, 218-233, 364-365, 462-465, 554-564, and 578-579, the entire disclosures of which are incorporated herein by reference. Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Variations in the parameters and/or conditions during production result in variations in the types of precipitated silicas produced. Although they are all broadly precipitated silicas, the types of precipitated silicas often differ significantly in physical properties and sometimes in chemical properties. These differences in properties are important and often result in one type being especially useful for a particular purpose but of marginal utility for another purpose, whereas another type is quite useful for that other purpose but only marginally useful for the first purpose.

The volume average pore size distribution function of the amorphous precipitated silica is determined by mercury porosimetry using an Autoscan mercury porosimeter (Quantachrome Corp.) in accordance with the accompanying operating manual. In operating the porosimeter, a scan is made in the high pressure range (from about 103 kilopascals absolute to about 227 megapascals absolute). The volume pore size distribution function is given by the following equation:

$$D_v(d) = \frac{P}{d} \frac{dV}{dP}$$

where:

$D_v(d)$ is the volume pore size distribution function, expressed in $cm^3/(nm \cdot g)$;

d is the pore diameter, expressed in nm;

P is the pressure, usually expressed in pounds per square inch, absolute; and

V is the pore volume per unit mass, usually expressed in $cm^3/g$.

Where the data are continuous or substantially continuous (i.e., small intervals between successive values of P), Dv(d) is determined by taking $\Delta V/\Delta P$ for small values of $\Delta P$ from either a plot of V versus P or preferably from the raw data. Each value of $\Delta V/\Delta P$ is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures or other graphical procedures for estimating dV/dP may be used when desired or when necessary due to large intervals between successive values of P.

For one class of amorphous precipitated silica used in the present invention the pore diameter at the maximum of the volume pore size distribution function is from about 7 to about 100 nanometers. Often the pore diameter at the maximum of the volume pore size distribution function is from about 10 to about 80 nanometers. In many cases the pore diameter at the maximum of the volume pore size distribution function is from about 15 to about 70 nanometers. Preferably the pore diameter at the maximum of the volume pore size distribution function is from about 20 to about 60 nanometers.

In the course of determining the volume average pore diameter by the above mercury porosimetry procedure, the maximum pore radius detected is sometimes noted. The maximum pore diameter is twice the maximum pore radius.

The total intruded volume is the total volume of mercury which is intruded into the amorphous precipitated silica during the high pressure scan described above divided by the mass of the amorphous precipitated silica constituting the sample under test. The total intruded volume of the nitrogen-functionalized amorphous precipitated silica used in the present invention may vary widely. In many cases, however, the total intruded volume is from about 0.5 to about 4 cubic centimeters per gram. Preferably the total intruded volume is from about 1 to about 3 cubic centimeters per gram.

The surface area of the nitrogen-functionalized amorphous precipitated silica used in the present invention may also vary widely. In many cases the surface area is from about 50 to about 400 square meters per gram. Often the surface area is from about 50 to about 200 square meters per gram. From about 50 to about 100 square meters per gram is preferred. As used in the present specification and claims, the surface area of the nitrogen-functionalized amorphous precipitated silica used in the present invention is the surface area determined by the Brunauer, Emmett, Teller (BET) method according to ASTM C 819-77 using nitrogen as the adsorbate but modified by outgassing the system and the sample for one hour at 180° C. ASTM C 819-77 is, in its entirety, incorporated herein by reference.

The nitrogen-functionalized amorphous precipitated silica may be in the form of aggregates of ultimate particles, agglomerates of aggregates, or a combination of both. The gross particle sizes of the nitrogen-functionalized amorphous precipitated silica used in the present invention may vary widely but ordinarily at least about 90 percent by weight of the nitrogen-functionalized amorphous precipitated silica has gross particle sizes in the range of from about 1 to about 2400 micrometers. In many cases at least about 90 percent by weight of the nitrogen-functionalized amorphous precipitated silica has gross particle sizes in the range of from about 1 to about 125 micrometers. Often at least about 90 percent by weight of the nitrogen-functionalized amorphous precipitated silica has gross particle sizes in the range of from about 5 to about 40 micrometers. Preferably at least about 90 percent by weight of the nitrogen-functionalized amorphous precipitated silica has gross particle sizes in the range of from about 5 to about 20 micrometers. Size reduction and/or classification may be used to adjust gross particle sizes as necessary or as desired. Gross particle sizes below about 125 micrometers are determined by use of a Model TAII Coulter counter (Coulter Electronics, Inc.) according to ASTM C 690-80 but modified by stirring the nitrogen-functionalized amorphous precipitated silica for 10 minutes in Isoton II electrolyte (Curtin Matheson Scientific, Inc.) using a four blade, 4.5 centimeter diameter propeller stirrer. ASTM C 690-80 is, in its entirety, incorporated herein by reference. Gross particle sizes larger than about 125 micrometers are determined by screening through sieves having openings of known size.

The neutralization of alkali metal silicate with acid to produce the amorphous precipitated silica also produces alkali metal salt of the acid(s) used for neutralization as by-product. It is preferred that the amount of such salt associated with the amorphous precipitated silica be low. When the amorphous precipitated silica is separated from the liquid of the reaction mixture, most of the salt is removed with the liquid. Further amounts of salt may conveniently be removed by washing the separated amorphous precipitated silica with water. In general, the greater the amount of water used for washing, the lower will be the salt content of the amorphous precipitated silica. It is usually preferred that the nitrogen-functionalized amorphous precipitated silica contain less than about 2 percent by weight alkali metal salt. It is preferred that the nitrogen-functionalized amorphous precipitated silica contain less than about 1.5 percent by weight alkali metal salt.

Organic surface modifiers which have at least one nitrogen-containing group selected from the class consisting of amino, quaternary ammonium, and diazonium, and which are associated with the amorphous precipitated silica are well known. The amino groups may be unsubstituted or they may be N-substituted or N,N-disubstituted. The substituents which may be present may be widely varied, but in general their natures and their numbers are such that they do not preclude the adsorption of glucoamylase as described above. In some instances the substituents are lower alkyl or phenyl. Examples of lower alkyl groups include methyl, ethyl, propyl, isopropyl, butyl, secondary butyl, isobutyl, and tertiary butyl. In other instances the substituents are chains constituting the polymer network, such as is the situation in polyethylenimine.

The organic surface modifier having at least one nitrogen-containing group may be a nitrogen-containing polymer or it may be nonpolymeric. Preferably, but not necessarily, the organic surface modifier has a plurality of nitrogen-containing groups.

In all instances the organic surface modifier having at least one nitrogen-containing group is associated with the amorphous precipitated silica. The nature of the association may be widely varied. The organic surface modifier may be attached to the amorphous precipitated silica by one or more primary chemical bonds such as covalent bonds or ionic bonds. When the organic surface modifier is a polymer, the association may be a physical association. In any event the association is such that the organic surface modifier having at least one nitrogen-containing group is not easily removed from the amorphous precipitated silica when the nitrogen-functionalized amorphous precipitated silica is used for removal of glucoamylase from aqueous media in accordance with the present invention.

Examples of suitable organic surface modifiers having at least one nitrogen-containing group or precursors of such organic surface modifiers include amines such as ortho-dianisidine, meta-dianisidine, 1,2-phenylenediamine, 1,3-phenylenediamine, 1,4-phenylenediamine, 2-(diethylamino)ethyl chloride, aniline, N,N-dimethylaniline, N,N-diethylaniline, N,N-diethylethylenediamine, N,N'-diethylethylenediamine, and pyridine. Other suitable amines include the amino alcohols and aminophenols such as ethanolamine, diethanolamine, ortho-aminophenol, meta-aminophenol, and para-aminophenol. Yet other suitable amines include amino-functional silanes such as gamma-aminopropyltrimethoxysilane and gamma-aminopropyltriethoxysilane. Still other suitable amines include the amino functional polymers such as polyethylenimine.

Other examples of suitable organic surface modifiers having at least one nitrogen-containing group or precursors thereof include quaternary ammonium compounds such as trimethylpropylammonium hydroxide and N-methylpyridinium iodide. The preferred quaternary ammonium compounds are surfactants which have a plurality of quaternary ammonium groups and which are known as polyquats.

Further examples of suitable organic surface modifiers having at least one nitrogen-containing group or precursors of such organic surface modifiers include diazonium salts such as ortho-toluenediazonium chloride and benzenediazonium chloride.

Of the organic surface modifiers having at least one nitrogen-containing group or precursors thereof, the polyethylenimines are preferred.

The polyethylenimines used in the present invention are well known materials.

The polyethylenimine homopolymer is a highly branched polyamine and is composed of units which have two carbons per nitrogen. These units are randomly distributed in the approximate ratios of one primary amino nitrogen/two secondary amino nitrogens/one tertiary amino nitrogen. The primary and secondary amino nitrogens comprise reaction sites whereby the polyethylenimine can be conveniently modified. Polyethylenimine homopolymers, except perhaps those of very high molecular weight, are water soluble. In order to reduce water solubility, the polyethylenimine may be modified in various known ways, of which there are many.

One way is to functionalize the polyethylenimine with groups which react with the surface hydroxyls of the amorphous precipitated silica to bond the polyethylenimine to the amorphous precipitated silica by primary bonds. Polyethylenimine reacted with an epoxy-functional silane such as gamma-glycidoxypropyltrimethoxysilane is an example of such a material. (N-Dimethoxysilylpropyl)polyethylenimine and (N-trimethoxysilylpropyl)polyethylenimine are other examples.

Alternatively, a coupling agent can be reacted with the amorphous precipitated silica and then with the later-applied polyethylenimine. An example of this method is to react the amorphous precipitated silica with gamma-glycidyloxypropyltrimethoxysilane and then to react the epoxy groups with the polyethylenimine.

Another way is to crosslink the polyethylenimine with a crosslinking agent. This may be accomplished before or after the polyethylenimine is applied to the amorphous precipitated silica. For example, the polyethylenimine may be crosslinked with 1,2-dichloroethane and then the crosslinked material may be applied to the amorphous precipitated silica. When proceeding in this manner, the crosslinking should not be so severe that the polymer becomes substantially insoluble. Another technique is to apply the polyethylenimine to the amorphous precipitated silica and then to react the deposited polyethylenimine with a crosslinking agent such as for example, glutaraldehyde. When practicing this technique, the crosslinking can be more severe than when crosslinked polyethylenimine is applied to the amorphous precipitated silica.

As used herein and in the claims, unless expressly indicated otherwise, the phrase "polyethylenimine-treated amorphous precipitated silica" means amorphous precipitated silica which has been coated and/or impregnated with homopolymer and/or copolymer of polyethylenimine, irrespective of whether or not the polymer is crosslinked, and irrespective of whether or not a coupling agent has been employed. Similarly, as used herein and in the claims, unless expressly indicated otherwise, the term "polyethylenimine" means homopolymer and/or copolymer of polyethylenimine, irrespective of whether or not the polymer is crosslinked, and irrespective of whether or not it has been functionalized with a coupling agent or other material.

The application of the organic surface modifier having at least one nitrogen-containing group to the amorphous precipitated silica may be accomplished in many ways. The organic surface modifier or a precursor thereof may be applied neat, as a solution of the organic surface modifier or precursor dissolved in inert organic solvent which is miscible with water, as a solution of the organic surface modifier or precursor dissolved in inert organic solvent which is immiscible or partially miscible with water, as an aqueous solution, or as an aqueous emulsion. Spraying, mixing, stirring, and tumbling are examples of techniques that may be used. Inert organic solvent, nonsolvent, and moisture may be removed by evaporation or drying. Preferably the organic surface modifier or precursor (neat, solution, suspension, dispersion, or emulsion) is added at the end of the precipitation and before filtration, after filtration to filter cake that has been liquified by stirring, or to the reslurried amorphous precipitated silica.

The nitrogen-functionalized amorphous precipitated silica is usually, but not necessarily, dried prior to use. There are many ways to dry the nitrogen-functionalized amorphous precipitated silica. Examples of such procedures include tray drying in an oven and drying in a rotary dryer. The preferred procedure for drying an aqueous dispersion or suspension of the nitrogen-functionalized amorphous precipitated silica is by drying in a spray dryer in which the feed is sprayed into a column of moving hot air. These drying procedures and others are themselves well known to the art. The drying equipment is usually operated at outlet temperatures of at least about 100° C. although lesser temperatures may be employed when lesser evaporation rates can be accepted. In most cases the drying equipment is operated at an outlet temperature in the range of from about 100° C. although lesser temperatures may be employed when lesser evaporation rates can be accepted. In most cases the drying equipment is operated at an outlet temperature in the range of from about 100° C. to about 170° C. From about 100° C. to about 130° C. is preferred.

The amount of organic surface modifier having at least one nitrogen-containing group present on the nitrogen-functionalized amorphous precipitated silica is susceptible to very wide variation. In general, more than trivial or inconsequential amounts of the organic surface modifier should be present. The maximum amount of the organic surface modifier present is not governed by theory, but by practical considerations such as the amount the amorphous precipitated silica can reasonably carry, the effect desired, and cost. Usually the organic surface modifier constitutes from about 1 to about 30 percent by weight of the nitrogen-functionalized amorphous precipitated silica. Frequently the organic surface modifier constitutes from about 5 to about 20 percent by weight of the nitrogen-functionalized amorphous precipitated silica. From about 10 to about 15 percent by weight is preferred.

When the organic surface modifier having at least one nitrogen-containing group is polyethylenimine, the same general considerations apply. Usually polyethylenimine constitutes from about 1 to about 30 percent by weight of the polyethylenimine-treated amorphous precipitated silica. Frequently polyethylenimine constitutes from about 5 to about 20 percent by weight of the polyethylenimine-treated amorphous precipitated silica. From about 10 to about 15 percent by weight is preferred.

In order to use the nitrogen-functionalized amorphous precipitated silica having the characteristics described above, it is brought into direct contact with the aqueous medium containing dissolved glucoamylase. This may be done batchwise or continuously. When the aqueous medium is beer, the nitrogen-functionalized amorphous precipitated silica is brought into direct contact with the aqueous medium at any point after the glucoamylase has been added and performed its function. Preferably, the fermented beer is filtered to recover the yeast cream and then the nitrogen-functionalized amorphous precipitated silica is contacted with the filtrate for a time sufficient to adsorb the glucoamylase to the desired concentration. The contacting operation may be effected, for example, by feeding the nitrogen-functionalized amorphous precipitated silica into the beer in a storage tank; by feeding the nitrogen-functionalized amorphous precipitated silica into the beer during transfer from one location to another; or by pumping the beer through a bed, either static or fluidized, of the nitrogen-functionalized amorphous precipitated silica. These are merely exemplary and serve to provide general guidance; details of the location and manner of introduction of the nitrogen-functionalized amorphous precipitated silica can vary widely. When the nitrogen-functionalized amorphous precipitated silica is brought into contact with the beer, glucoamylase is adsorbed and removed by the nitrogen-functionalized amorphous precipitated silica.

After the beer or other aqueous medium containing dissolved glucoamylase has been brought into contact with the nitrogen-functionalized amorphous precipitated silica, the nitrogen-functionalized amorphous precipitated silica is separated from the most of the liquid by any convenient solid-liquid separation procedure known to the art, as for example, decantation, filtration, or centrifugation.

The relative proportions of nitrogen-functionalized amorphous precipitated silica and the aqueous medium which are brought into mutual contact may be widely varied. In general, the relative proportions do not depend upon theory, but on practical considerations such as, for example, the concentration of the glucoamylase to be removed and the degree of removal desired. There is ordinarily no harm in using amounts of the nitrogen-functionalized amorphous precipitated silica above that needed to achieve the desired results, except that the use of excessive amounts of nitrogen-functionalized amorphous precipitated silica usually leads to the loss of excessive amounts of entrained liquid when the nitrogen-functionalized amorphous precipitated silica and liquid are substantially separated.

In the case of beer, the amount of nitrogen-functionalized amorphous precipitated silica brought into contact with the beer is ordinarily in the range of from about 0.02 to about 4 grams of the nitrogen-functionalized amorphous precipitated silica per 100 milliliters of beer. In many cases the amount of nitrogen-functionalized amorphous precipitated silica brought into contact with the beer is in the range of from about 0.1 to about 2 grams of the nitrogen-functionalized amorphous precipitated silica per 100 milliliters of beer. From about 0.1 to about 0.5 gram of the nitrogen-functionalized amorphous precipitated silica per 100 milliliters of beer is preferred.

The temperatures at which the nitrogen-functionalized amorphous precipitated silica and the aqueous medium are in mutual contact may also be widely varied. The temperatures used do not ordinarily depend on theory, but on practical considerations. In the case of beer, the temperature is usually in the range of from about $-5°$ C. to about $+100°$ C. Often the temperature is in the range of from about $+5°$ C. to about $+50°$ C. From about $+10°$ C. to about $+30°$ C. is preferred.

The contact time of the nitrogen-functionalized amorphous precipitated silica and the aqueous medium is also susceptible to wide variation and is generally governed by practical considerations rather than theory. For beer, the contact time of the nitrogen-functionalized amorphous precipitated silica and the beer is usually in the range of from about 5 seconds to about 12 months. A contact time in the range of from about 1 minute to about 2 months is often used. From about 5 minutes to about 30 minutes is preferred.

In terms of volume, by far the greatest amount of beer produced is light-colored. An amber-colored, bright, and transparent appearance is one of the great product characteristics of light-colored beer. If, however, the stability of beer is not adequate, a cloudiness known as haze can develop when the beer is stored for a prolonged time after packing into containers or when cooled. Such haze is undesirable since it is often perceived by consumers as the result of product deterioration.

Haze is generally classified into three types: (1) "chill haze", which is brought about when beer is cooled to about $0°$ C. but solubilized again when warmed to about $20°$ C.; (2) "permanent (or oxidized) haze", which is no longer solubilized even when the beer is warmed to $20°$ C.; and (3) "frozen haze", which is brought about when beer is frozen or stored at temperatures near the freezing point of about $-5°$ C. Of these, the type of primary concern is chill haze.

Chill haze is formed by the complexation of proteins with tannins or polyphenols. Various materials known as "chillproofing agents", "clarifiers", or "stabilizers" have been employed to remove chill haze or, more often, chill haze precursors. These are categorized as (1) those which break down the haze-forming proteins, e.g., enzymes such as proteases and papain; (2) those which remove the tannins and/or polyphenols, e.g., tannic acid, polyamides, and crosslinked polyvinylpolypyrrolidone; and (3) those which adsorb the haze forming proteins, e.g., swelling clays, porous glass, and various other siliceous materials. Combinations of such materials from the same category or from differing categories have also been employed.

Wort nitrogen can be separated into four classes. Haze instability is reported to be caused by the acidic protein-tannin complexes of high molecular weight (over 60,000) and is directly related to malt content. This is about 2 percent or less of wort nitrogen and is referred to as "Lundin Fraction A." Beer foam, which is a desirable characteristic, is produced by neutral proteins over 12,000 molecular weight associated with carbohydrates and hop bitter substances. These proteins constitute from about 2 percent to about 4 percent of wort nitrogen and are known as "Lundin Fraction B." The haze forming proteins themselves are reportedly smaller than the foam proteins. The lower molecular weight components, known as "Lundin Fraction C" are further subdivided into those which affect flavor (greater than about 10 and less than about 100 amino acid units) and those utilized by yeast (about 5 to about 10 amino acid units). Activated carbon and swelling clays such as bentonite adsorb all three Lundin Fractions. Bentonite, in addition to causing deleterious effects on foam and flavor, requires a lengthy cold storage period for settling. Enzymes have a negative impact on foam. Tannic acid has been found to preferentially precipitate the haze forming fraction without affecting foam and flavor. However, a large amount of precipitate is produced which settles to the bottom of the storage tank. The high cost of handling this precipitate and the accompanying large loss of beer are major drawbacks to the use of tannic acid.

A considerable advance in the art was the discovery of certain silica gels which preferentially adsorb the haze forming protein fraction. These silica gels are characterized by a narrow pore size distribution around a desired pore diameter. Amorphous precipitated silica has been suggested for use as a chillproofing agent. U.S. Pat. No. 3,480,390 discloses the use of amorphous precipitated silica as a chillproofing agent in which the properties of the amorphous precipitated silica are a surface area of at least 400 m$^2$/g and pore diameter of at least 6 nanometers. U.S. Pat. No. 3,554,759 discloses use of amorphous precipitated silica in the presence of water soluble polyvinyl pyrrolidone or its water soluble derivatives. European Patent Application Publication No. 0 287 232 discloses such use in which the properties of the amorphous precipitated silica are a surface area of from 450 to 1100 m$^2$/g, pore diameters of from 8 to 20 nanometers, pore volumes of from 1.6 to 2.5 mL/g, particle sizes of from 5 to 30 micrometers, and a moisture content of less than 25 percent by weight.

It has now been found that not only is the nitrogen-functionalized amorphous precipitated silica described above effective in removing glucoamylase from beer, but it is often also effective in removing at least a portion of the haze forming protein fraction present in the beer to be contacted. In many cases the adsorption is selective in that the glucoamylase and haze forming protein fraction are preferentially adsorbed while the flavor proteins and foam proteins remain largely unadsorbed. In such cases the nitrogen-functionalized amorphous precipitated silica is effective as a chillproofing agent as well as an adsorber of glucoamylase; chillproofing and glucoamylase removal can therefore be accomplished simultaneously.

The invention is further described in conjunction with the following examples which are to be considered illustrative rather than limiting, and in which all parts are parts by weight and all percentages are percentages by weight unless otherwise specified.

EXAMPLE 1

Three hundred grams of Hi-Sil® 132 amorphous precipitated silica (PPG Industries, Inc.) was slurried in 2 liters of distilled water. Two hundred twenty grams of Corcat TM P-600 XE aqueous polyethylenimine solution (30%-33% by weight polyethylenimine, average molecular weight 50,000-70,000; believed to be cross-linked with 1,2-dichloroethane; Virginia Chemicals) was added and the slurry was stirred for 1 hour. Afterwards, the slurry was first dried in a rotating evaporator to remove most of the water and subsequently in an oven at 105° C. for 2 hours. The resulting powder was washed 1 time in 2 liters of distilled water and 5 times in 2 liters of aqueous ethanol containing 20 percent by weight ethanol. After final vacuum filtration, the resulting cake was dried at 105° C. for 2½ hours to a moisture level of 1.5% by weight. This powder was then hammermilled.

Contacting process beer with polyethylenimine-treated amorphous precipitated silica was accomplished by dispersing 0.02 grams of the above polyethylenimine-treated amorphous precipitated silica in 10 milliliters of process beer and then mixing the slurry for 15 minutes. The polyethylenimine-treated amorphous precipitated silica was then removed from the slurry by vacuum filtration.

The amount of the enzyme, glucoamylase, remaining in the process beer after contact with polyethylenimine-treated amorphous precipitated silica was determined by assaying the supernatant liquid for glucoamylase activity. Glucoamylase activity was determined versus 2% by weight soluble starch in 0.1 molar sodium acetate buffer at pH 5.0 and 50° C. The appearance of glucose was monitored with a Yellow Springs Instrument Model 27 Industrial Analyzer equipped with a glucose oxidase membrane. One unit of glucoamylase activity was defined as the production of one micromole of glucose per minute under these conditions.

The glucoamylase activity of process beer taken from the same source but which had not been contacted with polyethylenimine-treated amorphous precipitated silica was determined according to the same analytical procedure.

One hundred times the ratio of the glucoamylase activity of the process beer contacted with polyethylenimine-treated amorphous precipitated silica to the glucoamylase activity of the process beer not so contacted, was reported as the Enzyme Removal Efficiency.

The results of this test and other properties of the treated silica are listed in Table 1.

EXAMPLE 2

Five hundred 500 grams of Hi-Sil® T-600 amorphous precipitated silica (PPG Industries, Inc.) and 100 grams of Nalcolyte® 8100 polyquaternized amino-functional polymer (Nalco Chemical Co.) were slurried in 3 liters of distilled water. The pH was adjusted from 4.3 to 7.6 with 41.9 grams of 20% aqueous sodium hydroxide. The slurry was mixed overnight and vacuum filtered. The resulting filter cake was washed 2 times in 1 to 2 liters of distilled water and 2 times in 1 to 2 liters of aqueous ethanol containing 20 percent by weight ethanol, at 60° C. After final vacuum filtration, the washed filter cake was dried at 105° C. for 2 hours. The resulting powder was hammermilled.

The presence of amine groups on the treated silica was determined by adding a few milligrams of the polyquaternized amino-functional polymer-treated amorphous precipitated silica to a few milliliters of distilled water and then adding a spatula tip of 2,4,6-trinitrobenzenesulfonic acid. The presence of amine groups was shown by the appearance of a yellow color.

Contacting process beer with polyquaternized amino-functional polymer-treated amorphous precipitated silica was accomplished by dispersing 0.02 gram of the above polyquaternized amino-functional polymer-treated amorphous precipitated silica in 10 milliliters of process beer and then mixing the slurry for 15 minutes. The polyquaternized amino-functional polymer-treated amorphous precipitated silica was then removed from the slurry by vacuum filtration.

The amount of the enzyme, glucoamylase, remaining in the process beer after contact with the polyquaternized amino-functional polymer-treated amorphous precipitated silica was determined by assaying the supernatant liquid for glucoamylase activity. Glucoamylase activity was determined versus 2% by weight soluble starch in 0.1 molar sodium acetate buffer at pH 5.0 and 50° C. The appearance of glucose was monitored with a Yellow Springs Instrument Model 27 Industrial Analyzer equipped with a glucose oxidase membrane. One unit of glucoamylase activity was defined as the production of one micromole of glucose per minute under these conditions.

The glucoamylase activity of process beer taken from the same source but which had not been contacted with polyquaternized amino-functional polymer-treated amorphous precipitated silica was determined according to the same analytical procedure.

One hundred times the ratio of the glucoamylase activity of the process beer contacted with polyquaternized amino-functional polymer-treated amorphous precipitated silica to the glucoamylase activity of the process beer not so contacted, was reported as the Enzyme Removal Efficiency.

The results of these tests and other properties of the treated silica are listed in Table 1.

EXAMPLE 3

One hundred grams of Hi-Sil ® 132 amorphous precipitated silica and 12 grams of gamma-aminopropyltriethoxysilane were slurried in 0.5 liter of distilled water. The pH was adjusted from 9.0 to 4.5 with glacial acetic acid. the slurry was then stirred for 10 minutes, left undisturbed for 1.5 hours, vacuum filtered, and dried at 130° C. overnight. The resulting powder was washed one time in 0.5 liter of distilled water and one time in 0.5 liter of aqueous ethanol containing 20 percent by weight ethanol, at 60° C. After final vacuum filtration, the washed filter cake was dried overnight at 130° C. and then hammermilled.

Contacting process beer with gamma-aminopropyltriethoxysilane-treated amorphous precipitated silica was accomplished by dispersing 0.02 gram of the above gamma-aminopropyltriethoxysilane-treated amorphous precipitated silica in 10 milliliters of process beer and then mixing the slurry for 15 minutes. The gamma-aminopropyltriethoxysilane-treated amorphous precipitated silica was then removed from the slurry by vacuum filtration.

Contacting process beer with gamma-aminopropyltriethoxysilane-treated amorphous precipitated silica was also accomplished by dispersing 0.05 gram of the above gamma-aminopropyltriethoxysilane-treated amorphous precipitated silica in 10 milliliters of process beer and then mixing the slurry for 15 minutes. The gamma-aminopropyltriethoxysilane-treated amorphous precipitated silica was then removed from the slurry by vacuum filtration.

The amount of the enzyme, glucoamylase, remaining in the process beer after contact with gamma-aminopropyltriethoxysilane-treated amorphous precipitated silica was determined by assaying the supernatant liquid for glucoamylase activity. Glucoamylase activity was determined versus 2% by weight soluble starch in 0.1 molar sodium acetate buffer at pH 5.0 and 50° C. The appearance of glucose was monitored with a Yellow Springs Instrument Model 27 Industrial Analyzer equipped with a glucose oxidase membrane. One unit of glucoamylase activity was defined as the production of one micromole of glucose per minute under these conditions.

The glucoamylase activity of process beer taken from the same source but which had not been contacted with gamma-aminopropyltriethoxysilane-treated amorphous precipitated silica was determined according to the same analytical procedure.

One hundred times the ratio of the glucoamylase activity of the process beer contacted with gamma-aminopropyltriethoxysilane-treated amorphous precipitated silica to the glucoamylase activity of the process beer not so contacted, was reported as the Enzyme Removal Efficiency (ERE).

The results of these tests and other properties of the treated silica are listed in Table 1.

EXAMPLE 4

Five grams of CPS076S isopropanol solution of (N-trimethoxysilylpropyl)polyethylenimine (50% by weight (N-trimethoxysilylpropyl)polyethylenimine, average molecular weight about 1000; Petrarch Systems Division, Huls America) was added to 0.5 liter of distilled water. Fifty grams of Hi-Sil ® 132 amorphous precipitated silica was added to form a slurry. The slurry was stirred for 30 minutes, left undisturbed for 2½ days, and then dried at 100° C. for 4 to 6 hours. The resulting powder was washed one time in 0.5 liter of distilled water and one time in 0.5 liter of aqueous ethanol containing 20 percent by weight ethanol. After final vacuum filtration, the filter cake was dried for 4 hours at 100° C. and then hammermilled.

The presence of amine groups on the treated silica was determined by adding a few milligrams of the (N-trimethoxysilylpropyl)polyethylenimine-treated amorphous precipitated silica to a few milliliters of distilled water and then adding a spatula tip of 2,4,6-trinitrobenzenesulfonic acid. The presence of amine groups was shown by the appearance of a yellow color.

Contacting process beer with (N-trimethoxysilylpropyl)polyethylenimine-treated amorphous precipitated silica was accomplished by dispersing 0.05 gram of the above (N-trimethoxysilylpropyl)polyethylenimine-treated amorphous precipitated silica in 10 milliliters of process beer and then mixing the slurry for 15 minutes. The (N-trimethoxysilylpropyl)polyethylenimine-treated amorphous precipitated silica was then removed from the slurry by vacuum filtration.

The amount of the enzyme, glucoamylase, remaining in the process beer after contact with (N-trimethoxysilylpropyl)polyethylenimine-treated amorphous precipitated silica was determined by assaying the supernatant liquid for glucoamylase activity. Glucoamylase activity was determined versus 2% by weight soluble starch in 0.1 molar sodium acetate buffer at pH 5.0 and 50° C. The appearance of glucose was monitored with a Yellow Springs Instrument Model 27 Industrial Analyzer equipped with a glucose oxidase membrane. One unit of glucoamylase activity was defined as the production of one micromole of glucose per minute under these conditions.

The glucoamylase activity of process beer taken from the same source but which had not been contacted with (N-trimethoxysilylpropyl)polyethylenimine-treated amorphous precipitated silica was determined according to the same analytical procedure.

One hundred times the ratio of the glucoamylase activity of the process beer contacted with (N-trimethoxysilylpropyl)polyethylenimine-treated amorphous precipitated silica to the glucoamylase activity of the process beer not so contacted, was reported as the Enzyme Removal Efficiency.

The results of this test and other properties of the treated silica are listed in Table 1.

TABLE 1

| Example No. | 1 | 2 | 3 | 4 |
| --- | --- | --- | --- | --- |
| BET Nitrogen Surface Area, m2/gram | 111 | 131 | 166 | 138 |
| Median Particle Size by Coulter Counter, μM | 10 | TNR[1] | 8.3 | 5.9 |
| Pore Diameter at the Maximum of the Volume Pore Size Distribution Function, nm | 25.0 | TNR | 11.5 | 17.5 |
| Total Intruded Volume, cm³/g | 1.57 | TNR | 1.27 | 1.51 |
| Amine Functionality | TNR | YES | TNR | YES |
| Enzyme Removal Efficiency, percent | | | | |
| at 0.02 gm/10 ml process beer | 91.8 | 15.6 | 51 | TNR |
| at 0.05 gm/10 ml process beer | TNR | TNR | 97 | 67 |

[1]TNR = Test Not Run.

Although the present invention has been described with reference to specific details of certain embodiments thereof, it is not intended that such details should be regarded as limitations upon the scope of the invention except insofar as they are included in the accompanying claims.

I claim:

1. In a process for removing glucoamylase from an aqueous medium in which said glucoamylase is dissolved, the improvement comprising contacting said aqueous medium with nitrogen-functionalized amorphous precipitated silica, wherein said nitrogen-functionalized amorphous precipitated silica is amorphous precipitated silica having associated therewith at least one organic surface modifier having at least one nitrogen-containing group selected from the class consisting of amino, quaternary ammonium, and diazonium, and wherein said nitrogen-functionalized amorphous precipitated silica has a pore diameter at the maximum of the volume pore size distribution function of from about 7 to about 100 nanometers.

2. The process of claim 1 wherein said nitrogen-functionalized amorphous precipitated silica is polyethylenimine-treated amorphous precipitated silica.

3. The process of claim 2 wherein after said aqueous medium has been brought into contact with said polyethylenimine-treated amorphous precipitated silica, said polyethylenimine-treated amorphous precipitated silica is separated from most of the liquid of said aqueous medium.

4. The process of claim 3 wherein said aqueous medium is beer.

5. The process of claim 4 wherein said beer is process beer.

6. The process of claim 4 wherein said polyethylenimine-treated amorphous precipitated silica has a pore diameter at the maximum of the volume pore size distribution function of from about 10 to about 80 nanometers.

7. The process of claim 4 wherein said polyethylenimine-treated amorphous precipitated silica has a pore diameter at the maximum of the volume pore size distribution function of from about 20 to about 60 nanometers.

8. The process of claim 4 wherein said polyethylenimine-treated amorphous precipitated silica has a surface area of from about 50 to about 400 square meters per gram.

9. The process of claim 4 wherein said polyethylenimine-treated amorphous precipitated silica has a total intruded volume of from about 0.5 to about 4 cubic centimeters per gram.

10. The process of claim 4 wherein at least about 90 percent by weight of said polyethylenimine-treated amorphous precipitated silica has gross particle sizes in the range of from about 1 to about 2400 micrometers.

11. The process of claim 4 wherein at least about 90 percent by weight of said polyethylenimine-treated amorphous precipitated silica has gross particle sizes in the range of from about 1 to about 125 micrometers.

12. The process of claim 4 wherein at least about 90 percent by weight of said polyethylenimine-treated amorphous precipitated silica has gross particle sizes in the range of from about 5 to about 20 micrometers.

13. The process of claim 4 wherein said polyethylenimine-treated amorphous precipitated silica contains less than about 2 percent by weight alkali metal salt.

14. The process of claim 4 wherein the amount of said polyethylenimine-treated amorphous precipitated silica brought into contact with said beer is in the range of from about 0.02 to about 4 grams of said polyethylenimine-treated amorphous precipitated silica per 100 milliliters of said beer.

15. The process of claim 4 wherein the amount of said polyethylenimine-treated amorphous precipitated silica brought into contact with said beer is in the range of from about 0.1 to about 0.5 gram of said polyethylenimine-treated amorphous precipitated silica per 100 milliliters of said beer.

16. The process of claim 4 wherein the temperature at which said polyethylenimine-treated amorphous precipitated silica and said beer are in mutual contact is in the range of from about −5° C. to about +100° C.

17. The process of claim 4 wherein the temperature at which said polyethylenimine-treated amorphous precipitated silica and said beer are in mutual contact is in the range of from about +5° C. to about +50° C.

18. The process of claim 4 wherein the temperature at which said polyethylenimine-treated amorphous precipitated silica and said beer are in mutual contact is in the range of from about +10° C. to about +30° C.

19. The process of claim 4 wherein the contact time of said polyethylenimine-treated amorphous precipitated silica and said beer is in the range of from about 5 seconds to about 12 months.

20. The process of claim 4 wherein the contact time of said polyethylenimine-treated amorphous precipitated silica and said beer is in the range of from about 1 minute to about 2 months.

21. The process of claim 4 wherein the contact time of said polyethylenimine-treated amorphous precipitated silica and said beer is in the range of from about 5 minutes to about 30 minutes.

22. The process of claim 21 wherein the temperature at which said polyethylenimine-treated amorphous precipitated silica and said beer are in mutual contact is in the range of from about +10° C. to about +30° C.

23. The process of claim 22 wherein said polyethylenimine-treated amorphous precipitated silica has a pore diameter at the maximum of the volume pore size distribution function of from about 20 to about 60 nanometers.

24. The process of claim 4 wherein polyethylenimine constitutes from about 1 to about 30 percent by weight of said polyethylenimine-treated amorphous precipitated silica.

25. The process of claim 4 wherein said beer prior to contacting with said polyethylenimine-treated amorphous precipitated silica contains haze forming protein fraction and wherein at least a portion of said haze forming protein fraction is adsorbed by said polyethylenimine-treated amorphous precipitated silica.

26. The process of claim 1 wherein said aqueous medium is beer which also contains haze forming protein fraction and wherein at least a portion of said haze forming protein fraction is adsorbed by said nitrogen-functionalized amorphous precipitated silica.

* * * * *